United States Patent [19]
Milsom

[11] Patent Number: 6,031,986
[45] Date of Patent: Feb. 29, 2000

[54] THIN-FILM PASSIVE CIRCUIT SIMULATION ON BASIS OF REDUCED EQUIVALENT CIRCUITS

[75] Inventor: Robert F. Milsom, Redhill, United Kingdom

[73] Assignee: U.S. Philips Corporation, New York, N.Y.

[21] Appl. No.: 09/047,153

[22] Filed: Mar. 24, 1998

[30] Foreign Application Priority Data

Mar. 25, 1997 [GB] United Kingdom .................... 9706154

[51] Int. Cl.[7] .............................. G06F 17/50; G06F 9/455
[52] U.S. Cl. ................................. 395/500.35; 395/500.26
[58] Field of Search ........................... 395/500.25, 500.26

[56] References Cited

U.S. PATENT DOCUMENTS 5,625,578   4/1997   Cloux et al. ............................. 364/578

FOREIGN PATENT DOCUMENTS

| 0615204A2 | 9/1994 | European Pat. Off. . |
| WO9420988 | 9/1994 | WIPO . |
| WO9505678 | 2/1995 | WIPO . |
| WO9627210 | 9/1996 | WIPO . |

OTHER PUBLICATIONS

"FASTERIX, an environment for PCB simulation", by R. du Cloux, et al., Electromagnetic Compatibility 1993, pp. 213–218.

"Reduced Equivalent Circuit Model for PCD", by R.F. Milsom et al., Philips J. Res. 48 1994, pp. 9–35.

"EMC Simulations and Measurements", by R. du Cloux, et al., Electromagnetic Compatibility 1995, pp. 185–190.

"Passive Schaltungen per Stempeldruck", in Elektronik Feb. 1995 pp. 50–56. (No English t'lation).

Primary Examiner—Kevin J. Teska
Assistant Examiner—Lonnie A. Knox
Attorney, Agent, or Firm—Steven R. Biren

[57] ABSTRACT

A simulator and its operation, for simulating electromagnetic behaviour of an IC (integrated circuit) of thin-film passive circuit components, uses a simple equivalent circuit model to minimise computer processing time while retaining good model accuracy in spite of the energy losses and different film thicknesses, conductivities and dielectric properties which occur in a passive integration IC. The procedure includes the steps of creating a geometric model of a surface of the conductor pattern of the IC, forming a matrix representation of Maxwell's equations with values associated with electric and magnetic field couplings between locations each of which is centered on a main geometrical element, the main geometrical elements being a subset of geometrical elements in the geometric model, and then correlating values of matrix coefficients of the equations with coefficients of an admittance matrix representative of an equivalent circuit model for the conductor pattern in terms of sub-circuits which are interconnected with each other via main nodes having a one-to -tne correspondence with the main geometrical elements. The sub-circuits between these main nodes of the equivalent circuit model for the passive integration IC includes sets of parallel branches of which a first branch includes a capacitor which modesl an electric field contribution, a second branch includes an inductor in series with a capacitor which together model a magnetic field contribution, and at least one further branch includes at least one resistor modelling a contribution to energy loss of the electric and magnetic fields, the energy loss occurring in both dielectric and conductive material of the IC.

11 Claims, 10 Drawing Sheets

$$R_{hl} = \frac{4\pi^2 (f^2 + f_c^2) L_{hl}^2}{\eta_b \alpha R_{hr}}$$

$$R_{hl} = \frac{4\pi^2 (f^2 + f_c^2) L_{hl}^2}{\eta_t R_{hr}}$$

$$\eta_t = \frac{k_t (1 + 2e^{-k_t} \sin k_t - e^{-2k_t})}{2 (1 - 2e^{-k_t} \cos k_t + e^{-2k_t})}$$

$$\eta_b = \frac{k_b (1 + 2e^{-k_b} \sin k_b - e^{-2k_b})}{2 (1 - 2e^{-k_b} \cos k_b + e^{-2k_b})}$$

FIG. 15

THIN-FILM PASSIVE CIRCUIT SIMULATION ON BASIS OF REDUCED EQUIVALENT CIRCUITS

BACKGROUND OF THE INVENTION

This invention relates to a simulator for simulating electromagnetic behaviour of an electrical conductor pattern. The invention also relates to a method of operating such a simulator in the design of a circuit and to design apparatus comprising such a simulator. The invention provides a simulator which can be used for the computer-aided design (CAD) of an integrated circuit of passive circuit components. The invention further relates to circuits designed using such a simulator and/or by such a method.

The paper "FASTERIX, an Environment for PCB simulation" by R du Cloux et al in the published papers of the 10th International Zurich Symposium on "Electromagnetic Compatibility 1993" pages 213 to 218 discloses a simulator for simulating electromagnetic behaviour of an electrical conductor pattern, by a process which includes the steps of:

creating a geometric model of a surface of the pattern, forming a matrix representation of Maxwell's equations with values associated with electric and magnetic field couplings between locations each of which is centred on a main geometrical element, which main geometrical elements are a subset of geometrical elements in the geometric model, and correlating values of matrix coefficients of the equations with coefficients of an admittance matrix representative of an equivalent circuit model for the pattern in terms of sub-circuits which are interconnected with each other via main nodes having a one-to-one correspondence with the main geometrical elements.

This type of simulator is herein designated as being of the REC type, which stands for Reduced Equivalent Circuit model type. Specific examples and uses of a REC type simulator for simulating a printed circuit board (PCB) layout are disclosed in this 1993 Zurich Symposium paper, in the papers "Reduced Equivalent Circuit Model for PCB" by R F Milsom et al., in Philips Journal of Research, Vol 48, Nos 1–2, 1994, pages 9 to 35, and "EMC Simulations and Measurements" by R du Cloux et al. in the published papers of the 11th International Zurich Symposium on "Electromagnetic Compatibility 1995", pages 185 to 190 and published European Patent Application EP-A-0 615 204 (and its United States equivalent 08/207,531). The whole contents of all these three papers and EP-A-0 615 204 are hereby incorporated herein as reference material. The REC type simulator is based on reducing an equivalent circuit model of the conductor pattern whose size corresponds to the number of geometrical elements, by correlating with an admittance matrix whose rank closely corresponds to the much smaller number of main geometrical elements (and main nodes). The smallest possible set of main geometrical elements is chosen to meet the criterion that the physical locations of the centres of the main elements are separated by no more than a short electrical length measured along conducting paths. This separation is a fraction (typically about $\frac{1}{10}$th) of the wavelength ($\lambda$min) corresponding to the maximum operating frequency of the circuit. Typically, when used to simulate a PCB layout whose dimensions are of the order of a wavelength or less at the operating frequency (such as in a mobile phone), an effective reduction of four orders of magnitude in computer processing time can be obtained by using this reduced equivalent circuit model, without substantial loss of model accuracy.

The REC type simulator embodiment described in EP-A-0 615 204 and the said three papers is suitable for simulating a PCB layout, which has one or more conductor patterns of a uniform conductivity and thickness which may be on one or more layers on or within an insulating substrate of uniform dielectric constant, and in which electromagnetic energy loss in the conductor patterns and in the dielectric substrate is low. Such a REC-type simulator package is available under the Trade Mark "FASTERIX" from product divisions and associated companies of Philips Electronics N.V. of Eindhoven, the Netherlands. The standard model in the current FASTERIX (Trade Mark) form of REC-type simulator is, however, very inaccurate when used directly for simulating a so-called "passive integration IC", which is an integrated circuit (i.e. IC) having thin-film passive circuit components. The predominant reasons for this inaccuracy are that energy losses are greater than in a PCB, the loss mechanisms are different, and the layer thicknesses differ much more widely.

Particular examples of Passive Integration ICs are disclosed in PCT Patent Applications International Publication Nos WO96/27210, WO95/05678 and WO94/20988 and in the article "Passive Schaltungen per Stempeldruck" in Elektronik 2/1995 pages 50–56. The whole contents of these patent applications and this article are hereby incorporated herein as reference material.

SUMMARY OF THE INVENTION

It is an aim of the present invention to avoid and mitigate these modelling problems so as to achieve considerable accuracy in simulating the electromagnetic behaviour of a passive integration IC, thus making the enormous power of a REC type simulator available for design of passive integration ICs.

According to one aspect of the present invention, there is provided a simulator of the REC type for simulating electromagnetic behaviour of an electrical conductor pattern, characterised in that the pattern forms part of an integrated circuit of thin-film passive circuit components, and in that each of the sub-circuits of the equivalent circuit model for the integrated circuit comprises a set of parallel branches of which:

a first branch includes a capacitor which models an electric field contribution, a second branch includes an inductor in series with a capacitor which together model a magnetic field contribution, and at least one further branch includes at least one resistor modelling a contribution to energy loss of the electric and magnetic fields, the energy loss occurring in dielectric material and conductive material of the integrated circuit.

The full set of sub-circuits (which make up the equivalent circuit model) model accurately the electromagnetic field in its entirety for this integrated circuit.

According to another aspect of the present invention, there is provided a method of operating a REC type simulator for simulating electromagnetic behaviour of an electrical conductor pattern, characterised in that the simulation is carried out for an integrated circuit of thin-film passive circuit components, the pattern forming part of the integrated circuit, and in that each of the sub-circuits of the equivalent circuit model for the integrated circuit comprises a set of parallel branches of which:

a first branch includes a capacitor which models an electric field contribution, a second branch includes an inductor in series with a capacitor which together model a magnetic field contribution, and at least one further branch includes at least one resistor modelling a contribution to energy loss of the electric and magnetic fields, the energy loss occurring in dielectric material and conductive material of the integrated circuit.

Thus, the present invention provides a different sub-circuit for setting up the equivalent circuit model such that its components can be modified to accurately reflect the local variations in the properties of the IC process. By choosing appropriately the main node locations and by modifying these component values, the present invention avoids and mitigates the modelling problems which arise in applying previous sub-circuit models to the simulation of the electromagnetic behaviour of a passive integration IC, so permitting considerable accuracy to be achieved in simulating passive integration ICs, and thus making the enormous power of a REC type simulator available for the design of passive integration ICs.

Various preferred features of the present invention are set out in the appended claims, particularly with respect to the modelling for thin-film resistors, thin-film capacitors, and thin-film inductors.

BRIEF DESCRIPTION OF THE DRAWINGS

These and other features in accordance with the present invention, and their advantages, are illustrated specifically in embodiments of the invention now to be described, by way of example, with reference to the accompanying diagrammatic drawings, in which:

FIG. 15 is a reproduction on a larger scale of equations (6), (7), (9) and (10).

Figure 1:
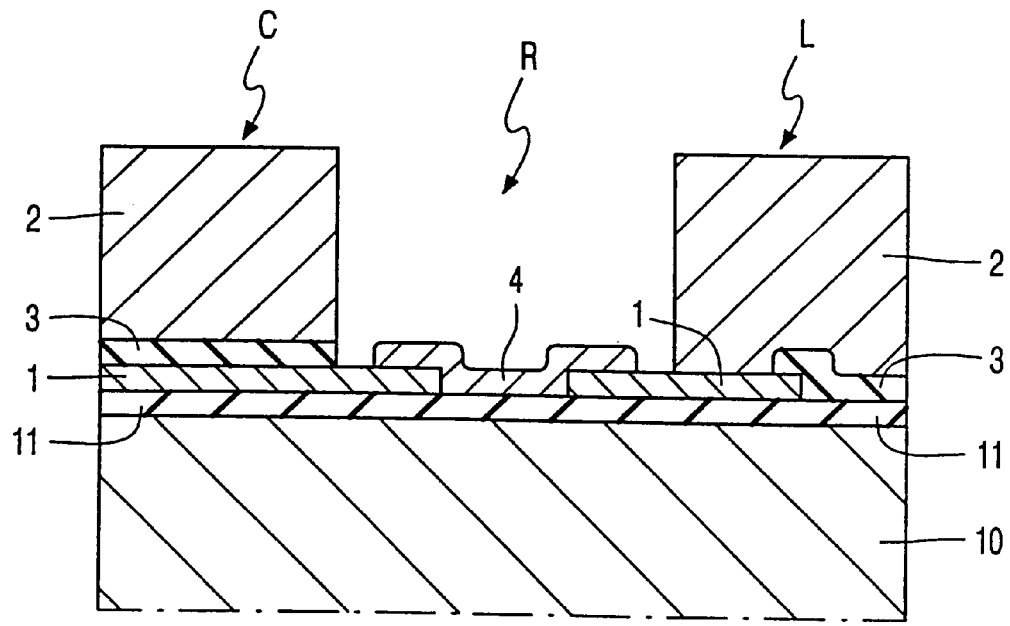
FIG. 1 is a schematic cross-section through part of a passive integration IC, showing various thin films used to fabricate the thin-film circuit components.

It should be noted that the FIGS. 1, 2 5 and 6 are diagrammatic and not drawn to scale. Relative dimensions and proportions of parts of these Figures have been shown exaggerated or reduced in size for the sake of clarity and convenience in the drawings. The same reference signs are generally used to refer to corresponding or similar features in different embodiments.

DESCRIPTION OF THE PREFERRED EMBODIMENTS

Passive Integration is a semiconductor-based process optimised for passive components. Resistors, capacitors and inductors can be realised at much reduced cost per unit area, and with better performance, than in a (monolithic silicon) active IC process. The passive integration IC comprises a semiconducting substrate 10 (usually of silicon) carrying a thin-film circuit on a dielectric film 11 (for example of silicon oxide) on a major surface of the substrate 10, as illustrated in FIG. 1. Specific examples of passive integration IC technologies are illustrated in WO97/27210, WO95/05678 and WO94/20988 and in the Elektronik 2/1995 article. A low-loss variant of the process has been developed for RF (radio frequency) applications. RF signal processing functions can now be realised optimally using such ICs either stand-alone or in combination with active ICs, for example as an MCM (multi-chip module) in a standard IC package.

A cross-section of the layer structure used in the RF process is shown in FIG. 1. There are two layers of metallisation 1 and 2 which form the conductor pattern of this IC. The upper metallisation 2 may be of, for example, gold typically 10 $\mu$m thick, and the lower metallisation 1 may be of, for example, aluminium typically 100 nm thick. A dielectric film 3 (for example, of silicon nitride typically 200 nm thick) is present between the metallisation patterns 1 and 2. The thin-film circuit components are basically formed from these thin films 1,2 and 3.

Figure 2:
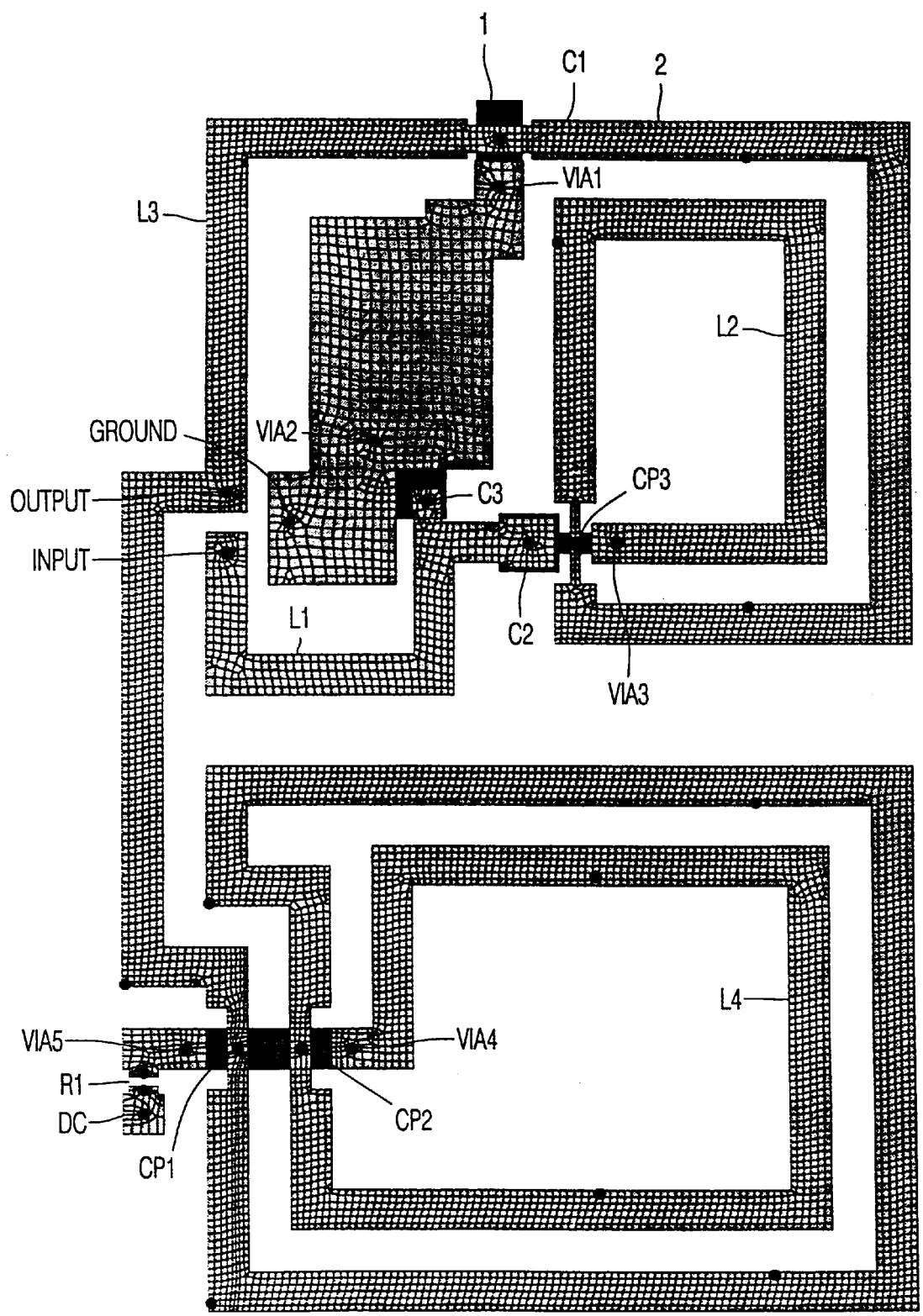
FIG. 2 is a plan view of the layout of an example of a passive integration IC, showing also the BEM mesh and "super-node" locations used for the simulation of its electromagnetic behaviour.

Capacitors C are formed by an area of the silicon nitride film 3 between overlapping areas of the aluminium bottom film 1 and the gold top film 2. Thin-film capacitors C1, C2, C3, CP1, CP2 and CP3 are illustrated in the layout of FIG. 2. CP1, CP2 and CP3 are parasitics which are unavoidable in the design of the type of multi-turn inductors illustrated here. It is important for the accuracy of the model that these parasitics CP1, CP2 and CP3 are treated in the same way as wanted capacitors C1, C2 and C3 of the IC. Capacitor values for C1,C2,C3 of up to a few hundred pF/mm² can be obtained. In areas where capacitors are not defined, these films 1, 2 and 3 are selectively etched away as defined by the mask patterns.

Resistors R with values up to a few K$\Omega$ are formed by sputtering a thin layer 4 of resistive material (for example titanium tungsten) in areas where both the dielectric film 3 and metallisation films 1 and 2 have been removed. The resistive layer 4 overlaps two spaced regions of the conductor pattern 1,2 which provide the connections of the resistor.

The space occupied by a thin-film resistor R1 is indicated in the layout of FIG. 2. The actual resistor pattern 4 has been removed from the layout for purposes of simulation, as discussed below.

Inductors L are formed using at least one strip (for example in a spiral) predominantly in the gold top film 2, in areas where the aluminium film 1 has been largely removed. The bottom aluminium film 1 is retained over a small area to provide a return path for inductors with more than one turn. Gold vias (through an opening in the dielectric film 3) connect the two metal films 1 and 2 where such a connection is required. The layout illustrated in FIG. 2 includes five vias VIA1, VIA2, VIA3, VIA4 and VIA5. For RF applications, inductor values up to about 10 nH have been obtained, with Q-factors of several tens. Thin-film inductors L1, L2, L3 and L4 are illustrated in the layout of FIG. 2.

FIG. 2 shows the metallisation layout pattern for an example of a passive integration IC design (in this case for an inter-stage matching circuit of a power amplifier). The points of external connection to the IC are labelled in FIG. 2 as INPUT, OUTPUT, GROUND and DC. The top metal film 2 is shown superimposed over the bottom metal film 1. The FASTERIX (Trade Mark) simulator package contains a geometry preprocessor which sub-divides each of the conductor patterns 1 and 2 into small quadrilateral elements. The elements of the pattern 2 are shown in FIG. 2, but some of the elements of the pattern 1 are hidden in FIG. 2, below the superimposed pattern 2. The total set of elements is used in the BEM (Boundary Element Method) numerical solution of Maxwell's equations, which govern the behaviour of the electromagnetic fields, and hence determine the electrical behaviour of the IC.

The present invention provides a simulator for simulating electromagnetic behaviour of such a pattern 1,2, by a process which includes the steps of:

creating a geometric model (the mesh of FIG. 2) of a surface of the conductor patterns 1 and 2, the model including contiguous geometrical elements which are quadrilateral in the FASTERIX (Trade Mark) simulator, forming a matrix representation of Maxwell's equations with values associated with electric and magnetic field couplings between locations each of which is centred on a main geometrical element, (these main geometrical elements which are each identified by a dot in FIG. 2 are a subset of all the geometrical elements in the mesh), and correlating values of matrix coefficients of the equations with coefficients of an admittance matrix representative of an equivalent circuit model for the pattern 1,2 in terms of sub-circuits (FIG. 4) which are interconnected with each other via main nodes (labelled as I and II in FIG. 4) having a one-to-one correspondence with the main geometrical elements. (These main nodes are so-called "super-nodes" in FASTERIX terminology).

In accordance with the present invention, the pattern 1,2 forms part of an integrated circuit of thin-film passive circuit components (FIGS. 1 and 2), and each of the sub-circuits of the equivalent circuit model for the integrated circuit comprises a set of parallel branches (FIG. 4) of which:

a first branch includes a capacitor $C_{hc}$ which models an electric field contribution;

a second branch includes an inductor $L_{hl}$ in series with a capacitor $C_{hl}$ which together model a magnetic field contribution, and at least one further branch includes at least one resistor $R_{hl}$ and $R_{hg}$ modelling a contribution to energy loss in the electric and magnetic fields, this energy loss occurring in dielectric material and in conductive material of the integrated circuit.

Thus, FIG. 2 shows the geometrical elements of the geometric model. A small sub-set of these generated elements, identified by dots in FIG. 2, contain the physical locations corresponding to M main nodes (so-called "super-nodes" in FASTERIX terminology) of the equivalent circuit model. A simple sub-circuit, or branch model, connects each pair of the "super-nodes". By contrast therewith, standard BEM simulation would involve the solution of the order of N linear equations for each frequency sample, where N is the total number of quadrilateral elements in the two patterns 1 and 2. In this example, where N is greater than 10000, several hours of computing would be required for each frequency (possibly several days altogether). An REC type simulator such as FASTERIX solves a similar set of linear equations only once, in order to determine its equivalent circuit component values.

A standard analogue circuit simulator (for example, the simulator available under the Trade Mark PSTAR, from product divisions and associated companies of Philips Electronics N.V.) may then be used to obtain the frequency-domain solution from the circuit model. The number of linear equations employed in the circuit simulator is only of the order of M (which is less than 100 in this example).

Therefore, the overall solution typically requires a few hours for the once-only computation of the equivalent circuit using the BEM field solver, and then less than a minute to obtain the frequency response. A further major advantage of the equivalent circuit model is that additional active and passive components which are not explicitly part of (but are connected to) the passive IC structure may be included in the simulation.

Figure 13:
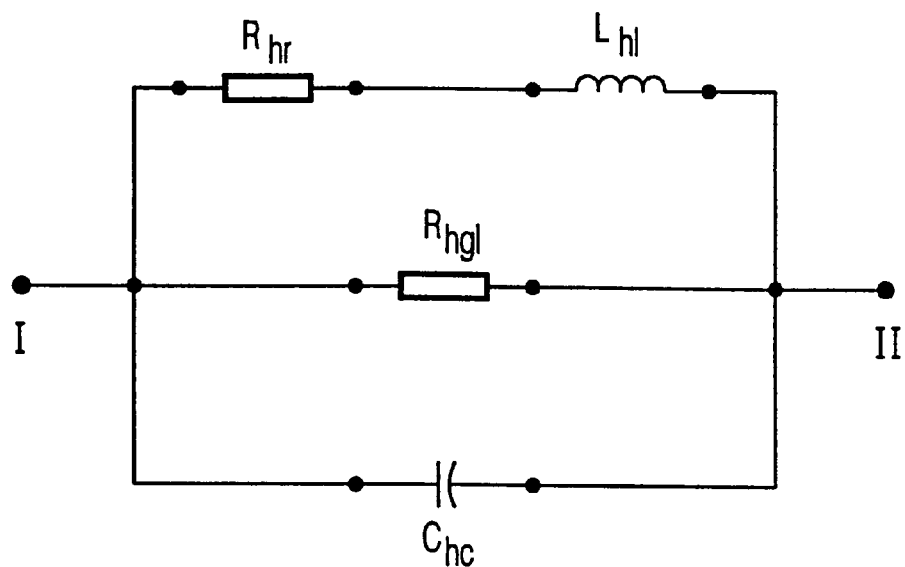
FIG. 13 is a circuit diagram of a standard FASTERIX (Trade Mark) branch model.

There are several types of "super-node" to "super-node" branch model available in the FASTERIX simulator, but the basic model is that shown in schematic form in FIG. 13. The capacitor $C_{hc}$ and inductor $L_{hl}$ respectively model the electric and magnetic fields, while resistors $R_{hr}$ and $R_{hg}$ respectively model conductor loss and dielectric loss. The fact that the electrical behaviour of such a complex physical structure can be accurately modelled with so few components follows from an approximation that exploits the high ratio of electrical length to physical size for real applications. Strictly, the model applies only to loss free structures, in which case resistors $R_{hr}$ and $R_{hg}$ do not appear. However, loss mechanisms are modelled to a good approximation, using the circuit shown, when energy lost is small compared to the stored energy, and both dielectric loss and conductor loss are broadly homogeneous. Effectively, loss components in each branch model characterise a contribution to the average loss in the structure as a whole.

The above conditions for validity of the approximate treatment of loss are met by the conventional PCB structure, because only one dielectric material is used, and the conductors have the same thickness and conductivity on all layers, and typical PCB size ensures that the ratio of energy lost to energy stored is small at all frequencies above about 1 MHz. At lower frequencies the energy lost is proportionately higher, and so the model breaks down. For this reason the standard model is referred to, in FASTERIX simulator terminology, as the "high-frequency model". There is also a more complex variant called the "full-frequency model" which is valid down to DC, but this model also requires the same homogeneity condition to be met.

This invention provides a number of modifications which allow the "high-frequency model" to be used for simulation of passive integration ICs designed for RF applications, over a frequency range from a frequency just above DC up to some user-specified upper limit (typically a few GHz). Without these modifications provided in accordance with the invention no suitable CAD tool would be available for simulating the electromagnetic behaviour of passive integration ICs, and so a much more time consuming cut-and-try approach would be needed for their development. Examination of FIG. 1 shows that the materials and layer structure used in the RF Passive Integration process do not meet the homogeneity condition required for validity of the standard models in the FASTERIX simulator. The much smaller linear dimensions of a passive integration IC (as compared with those of a PCB, typically only a few mm square) also ensure that the energy lost is proportionately much greater, thus violating the other condition for validity.

Figure 3:
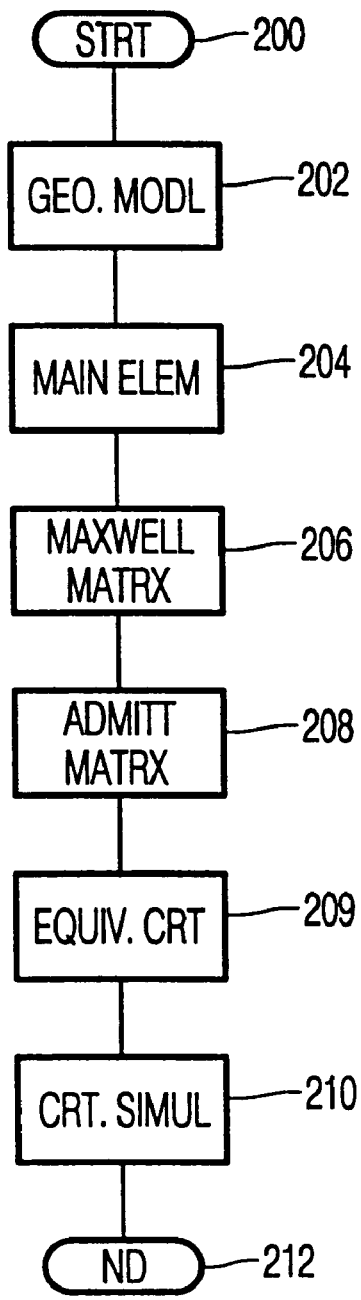
FIG. 3 is a flow chart illustrating REC type simulator operation.

Apart from these modifications in accordance with the present invention, the process of simulating electromagnetic behaviour of a passive integration IC in accordance with the present invention may be carried out with a known REC type simulator such as FASTERIX (Trade Mark) and following the same basic process steps as described in, for example, EP-A-0 615 204 and its US equivalent, the said Philips Journal of Research Article, and the said Zurich Symposium papers. Thus, FIG. 3 is a flow chart (similar to that of FIG. 2 of the US equivalent of EP-A-0 615 204) which illustrates the basic process steps in terms of the following blocks:

200—the start of the procedure;
202—the creation of the geometric model (the FIG. 2 mesh in both film patterns 1 and 2), with its large number of contiguous non-overlapping geometrical elements;
204—identification of a minimum number of main geometrical elements which are short electrical distances apart as measured along conducting paths (these main geometrical elements corresponding to the small number of "super-nodes": indicated with the dots in FIG. 2 and comprising both user-supplied (i.e. accessible) super-nodes and automatically-generated (i.e. internal) super-nodes);
206—creation of Maxwell's equations in matrix form with values associated with field couplings between locations at the centres of the main geometrical elements;
208—correlation of the values of matrix coefficients of the equations with coefficients of an admittance matrix representative of the equivalent circuit model of the conductor pattern, the admittance matrix being of a low rank corresponding to the small number of "super nodes" between which the parallel-branch sub-circuits (FIG. 4) are connected;
209—conversion of the admittance matrix to the equivalent circuit composed of all the parallel-branch sub-circuits (FIG. 4);
210—running the simulation for this equivalent circuit model (together with models of any external components added thereto) using a circuit analyser such as, for example, the Philips PSTAR (Trade Mark) simulator;
212—the end of the procedure.

Figure 14:
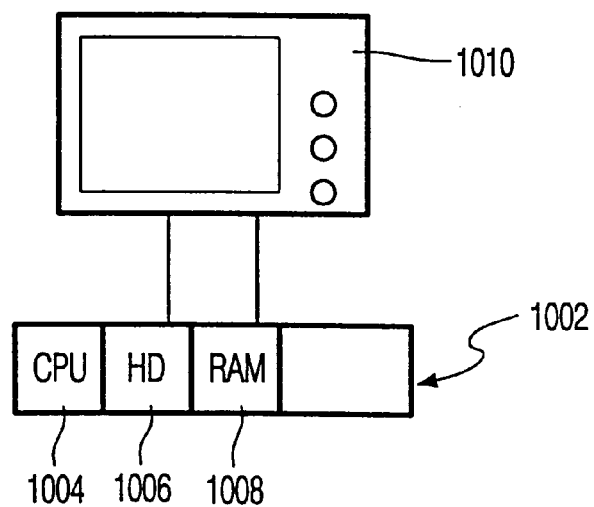
FIG. 14 illustrates typical computer hardware as the basis for a design apparatus comprising a simulator in accordance with the invention.

FIG. 14 is a schematic representation of typical computer hardware for implementing the invention. The hardware provides a workstation for the IC designer (a human person) and comprises a computer console 1002 having a central processing unit (CPU) 1004, a storage device such as a hard disk (HD) 1006, random access memory (RAM) 1008 and a monitor 1010. This apparatus is programmed to operate in accordance with the invention by storing the circuit modelling and simulation programs (the modified FASTERIX™ program and, for example, the PSTAR™ program) on the hard disk 1006. When this design apparatus is being used to design a specific passive integration IC, data defining the IC (its circuit, its thin-film circuit components and its geometry) and required analyses are also then stored on the hard disk 1006. However, instead of storage on the hard disk 1006, the programs and data may be provided to the CPU by any other known means, for example by being stored remotely and loaded across a network. The CPU 1004 reads the programs and data into RAM 1008, performs the required calculations (following the FIG. 3 flow chart) and ultimately provides an output which may be displayed on a monitor 1010 and/or printed out on a plotter (not shown).

To understand simulator operation in accordance with the present invention it is beneficial to consider in more detail the role of "super-nodes". In the standard FASTERIX model there are two types:

User-supplied "super-nodes": these are located at points of electrical connection of the structure to other components (thus allowing separate circuit models to be added, e.g. for SMD (Surface-mounted device) components in the case of a PCB), and at points of connection between conducting layers (thus allowing separate circuit models for vias to be added)

automatically-generated "super-nodes": these are added to satisfy the condition that each "super-node" is separated, along a conducting path, by an electrically-short distance (at the user-specified maximum frequency of model validity) from at least one other "super-node". Thus, this distance is generally a small fraction (for example, a tenth) of the wavelength corresponding to the specified maximum operating frequency of the circuit.

Figure 4:
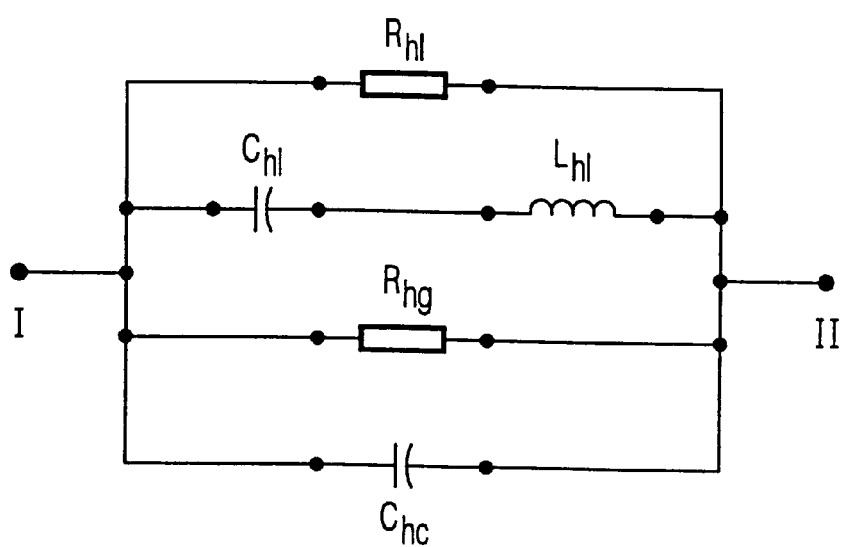
FIG. 4 is a circuit diagram of a parallel-branch model used for the sub-circuits of a dynamically equivalent circuit model of the passive integration IC in the REC type simulator operation of FIG. 3 in accordance with the present invention.
Figure 5:
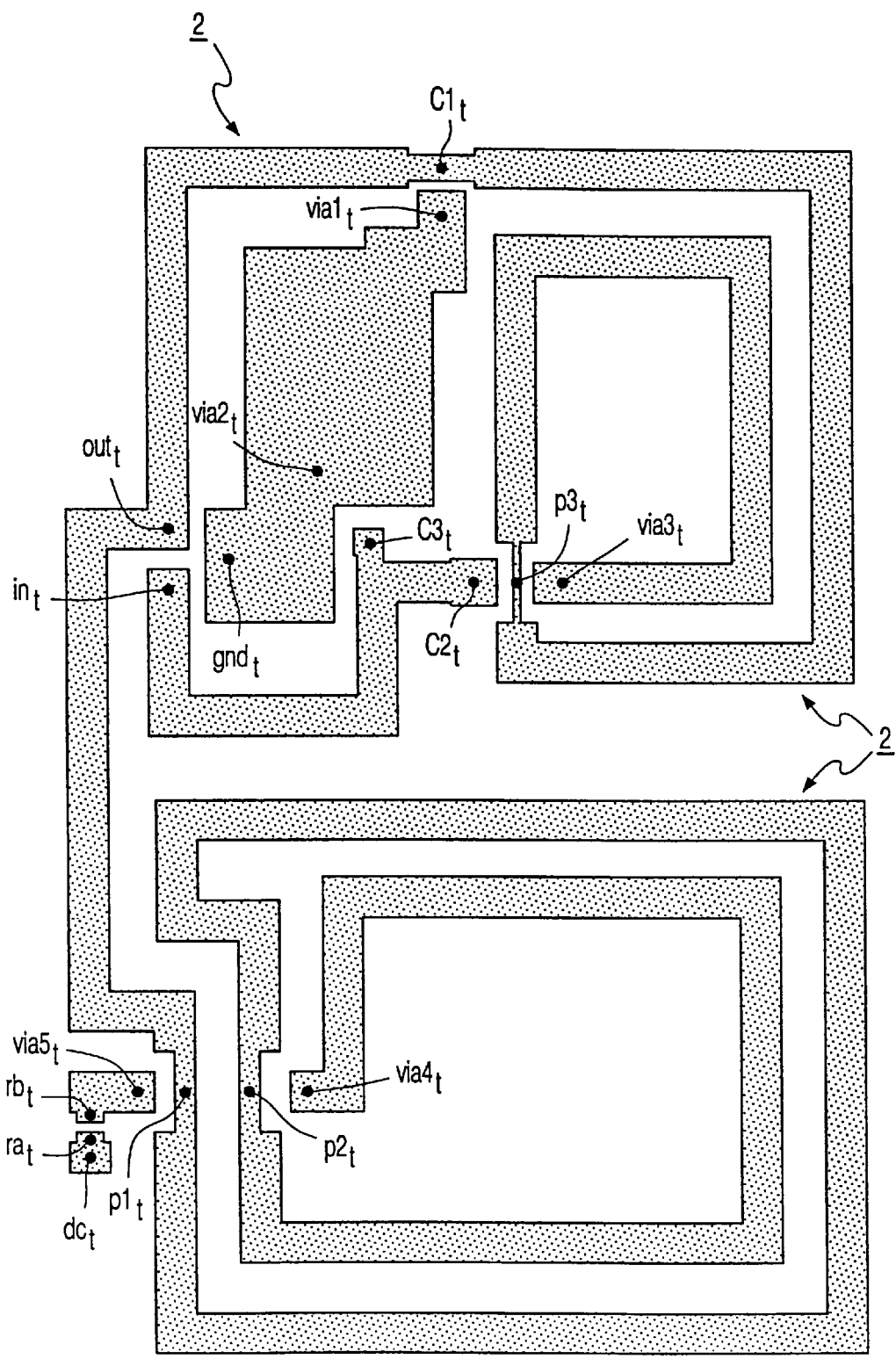
FIG. 5 is a plan view of the upper conductor pattern of the passive integration IC of FIG. 2, and showing user-supplied "super-nodes"
Figure 6:
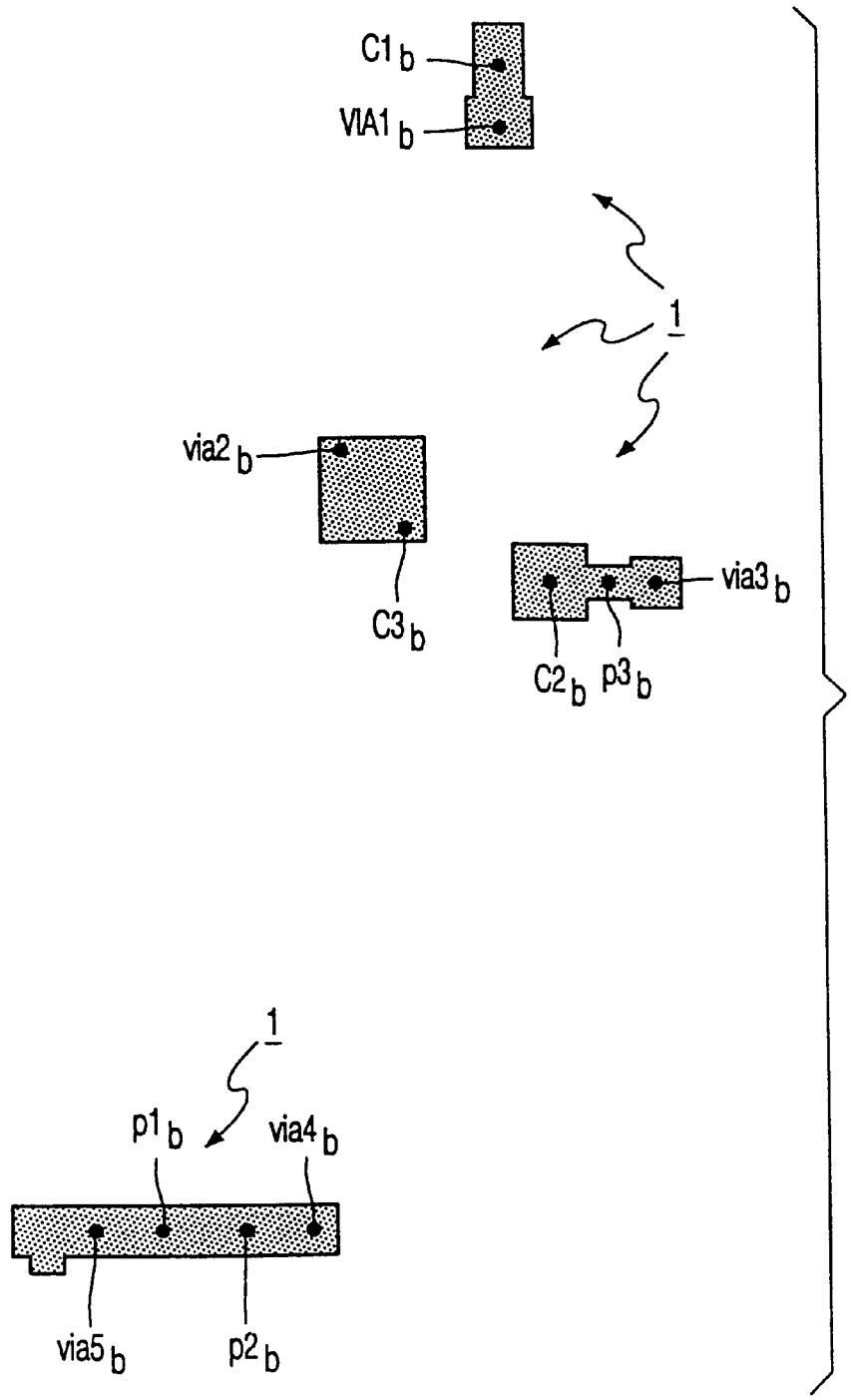
FIG. 6 is a plan view of the lower conductor pattern of the passive integration IC of FIG. 2, and showing user-supplied "super-nodes"

As well as the FIG. 4 modification to the branch models, the present invention provides for the specification of additional "super-nodes". Thus, "super-nodes" are allocated to the thin-film passive circuit components. Ideally the extra "super-nodes" would be added automatically by the REC type simulator software, but it is also possible for them to be user-supplied. Each modified branch model has the general schematic form shown in FIG. 4. However, there are several types of this general form, the differences between which only concern how the component values are calculated. The various problems with the standard FASTERIX simulator model, and the way in which the invention overcomes them, are discussed in more detail below. The above IC design example of FIGS. 1 and 2 is used to illustrate each problem and solution, as follows:

Super-nodes:

FIGS. 5 and 6 show the layout of the top metallisation 2 and bottom metallisation 1 respectively, together with the user-supplied "super-nodes". Of these $in_t$, $out_t$, $gnd_t$, and $dc_t$ are the points of connection to the IC (in this case for an RF probe and power supply), and the pairs $\{via1_t, via1_b\}$, $\{via2_t, via2_b\}$, $\{via3_t, via3_b\}$, $\{via4_t, via4_b\}$, $\{via5_t, via5_b\}$, are the five pairs of "super-nodes" provided to allow models of vias between the two levels to be inserted; (short-circuit components were actually used). The remaining "super-nodes" are provided in accordance with the invention and comprise: $\{ra_t, rb_t\}$; $\{c1_t, c1_b\}$, $\{c2_t, c2_b\}$, $\{c3_t, c3_b\}$, $\{p1_t, p1_b\}$, $\{p2_t, p2_b\}$ and $\{p3_t, p3_b\}$. Thus, a pair of "super-nodes" is allocated to each of the thin-film passive components R1, C1, C2, C3 and the parasitics CP1, CP2 and CP3 of the passive integration IC.

Thin-film Resistors:

There is one thin-film resistor R1 the space for which is shown in the example, but typically there may be several in a passive integration IC. The inclusion of these resistors in the BEM field solution leads to large errors, due to the consequent low ratio of overall energy stored in the structure to energy lost. This problem is overcome in accordance with the invention by modifying the layout prior to the electromagnetic field analysis. This involves first removing the resistive layer 4, and then adding a "super-node" at each of the two physical locations on the conductor pattern 1,2 where each thin-film resistor would be connected. These "super-nodes" are labelled $ra_t$ and $rb_t$ for the single resistor R1 in the example illustrated in FIG. 5. The problem of numerical inaccuracy in the field solution caused by the lossy resistor material is removed in this manner. A suitable model for each resistor (layer 4) is then added to the equivalent circuit, connected between the corresponding "super-nodes". This approximation is valid only when thin-film resistors are physically very small in area compared to the layout as a whole, a condition that is almost always met in practice.

Thin-film Capacitors:

There are two problems with thin-film capacitors in the standard FASTERIX simulator models. Firstly, the high ratio of lateral dimensions to thickness (typically greater than 100) causes local numerical inaccuracy in the BEM field solution, leading to errors of the order of 5% in the effective capacitance of areas of overlap between the two metal layers. Secondly, the much lower dielectric loss in the silicon nitride film 3, compared to that in the structure as a whole, means that the loss-averaging referred to above leads to a serious local over-estimate.

These problems are overcome in accordance with the invention by adding an extra pair of "super-nodes" for each overlap region. The physical locations are at, or close to, the centroid of each such region, one in each metal film 1 and 2. In the example there are six such pairs associated with capacitors C1, C2, C3 and parasitics CP1, CP2 and CP3, namely: $\{c1_t, c1_b\}$, $\{c2_t, c2_b\}$, $\{c3_t, c3_b\}$, $\{p1_t, p1_b\}$, $\{p2_t, p2_b\}$ and $\{p3_t, p3_b\}$. With the additional "super-nodes" located at these positions, the capacitor $C_{hc}$ (in the instance of the branch model which connects the two "super-nodes" of such a pair) can be identified with the thin-film capacitor itself, while the resistor $R_{hg}$ can be identified with the dielectric loss in the thin-film capacitor. In accordance with the invention, the inaccurate values of $C_{hc}$ and $R_{hg}$ calculated by the standard FASTERIX simulator for these branches, are replaced by values calculated from the well-known parallel-plate approximation, which is extremely accurate for such high aspect ratios. Thus, $$C_{hc} = \frac{\epsilon A}{h} \quad (1)$$

and $R_{hg}$ is a frequency-dependent resistor given by:

$$R_{hg} = \frac{1}{2\pi f \tan\delta C_{hc}} \quad (2)$$

where $\epsilon$ and $\tan\delta$ respectively are the dielectric constant and loss tangent of the silicon nitride, A and h respectively are the area of overlap and separation of the two metal films 1 and 2, and f is the frequency.

Fringing Capacitors:

For all instances of branches other than those relating to thin-film capacitors, the capacitor $C_{hc}$ characterises the fringing electric field, a very high proportion of whose energy is stored in the silicon substrate 10. The value of $C_{hc}$ is accurately calculated by the FASTERIX simulator BEM field solver in this case. However the loss in the semiconductor substrate 10 associated with its relatively high conductivity $\sigma_{Si}$ compared to the dielectric films 3 and 11, is under-estimated by the loss-averaging approximation. However, an effective loss tangent $\tan\sigma_{Si}$ for the semiconductor substrate 10 can be defined in terms of its conductivity and permittivity $\epsilon_{Si}$ by:

$$\tan\delta_{Si} = \frac{\sigma_{Si}}{2\pi f \epsilon_{Si}} \quad (3)$$

Therefore, in accordance with the invention, the value of $R_{hg}$ in all instances of branches not corresponding to thin-film capacitors is replaced by:

$$R_{hg} = \frac{\epsilon_{Si}}{\sigma_{Si} C_{hc}} \quad (4)$$

while the value of $C_{hc}$ retains its original value.

Inductors/Conductor Loss:

The set of self-inductors $L_{hl}$, in the standard FASTERIX simulator model, characterises both self and mutual inductance effects associated with the physical layout of the conductors. The use of self-inductance to model mutual inductance is extremely powerful, but it is also counter-intuitive since it implies that mutual coupling between isolated conductors increases with decreasing frequency. In fact the model is correct except at DC because the actual values of the $L_{hl}$ ensure that magnetic fields tend to cancel at low frequency. However, energy loss from the conductors, characterised by the resistors $R_{hr}$, upsets this cancellation unless it is negligible compared to the energy stored in the magnetic field. Unfortunately this condition only holds above at least 1 GHz for typical passive integration IC devices, and so the inaccuracy is very significant over frequencies of interest. Further, the individual values of the $L_{hl}$ are inaccurately calculated when there is a wide disparity between the DC surface resistivities of the two conducting films 1 and 2.

These problems are overcome in accordance with the invention by taking the following steps. Firstly, prior to running the BEM field solver, the values of the thickness $h_b$ and conductivity $\sigma_b$ of the bottom metal film 1 are set equal to the higher values of the top metal film 2 ($h_t$ and $\sigma_t$). Secondly, subsequent to the derivation of the standard "high-frequency model", for each branch instance, a capacitor $C_{hl}$ is connected in series with $L_{hl}$, and the series resistor $R_{hr}$ is replaced by an equivalent frequency-dependent parallel resistor $R_{hl}$. This is the branch model as illustrated in FIG. 4. The components of these branches are assigned values as follows:

$$C_{hl} = \frac{-1}{L_{hl}(2\pi f_c)^2} \quad (5)$$

where $f_c$, is a cut-off frequency below which the influence of the inductors is reduced so that less reliance is placed on the numerically unstable cancellation referred to above. (The value of $f_c$ is not very critical, and a value of typically 10 MHz has been shown to be suitable for the passive integration process technology illustrated.) The above definition of $C_{hl}$ also ensures that the required cancellation of reactances is preserved by the $C_{hl}:L_{hl}$ series combinations.

The form of $R_{hl}$ depends on which of two categories of branch (see below) a given instance falls into, as governed by the nets (isolated areas of metallisation) containing the two "super-nodes" between which the branch is connected. In the following equations the subscript "b" relates to the bottom metallisation film 1, whereas the subscript "t" relates to the top metallisation film 2.

For a branch between two "super-nodes" on the same bottom-metal net:

$$R_{hl} = \frac{4\pi^2(f^2 + f_c^2)L_{hl}^2}{\eta_b \alpha R_{hr}} \quad (6)$$

For a branch between each and every other pair of "super-nodes":

$$R_{hl} = \frac{4\pi^2(f^2 + f_c^2)L_{hl}^2}{\eta_t R_{hr}} \quad (7)$$

where $\alpha$ is the ratio of the DC surface resistivities of the two metallisation films 1 and 2 given by:

$$\alpha = \frac{\sigma_t h_t}{\sigma_b h_b} \quad (8)$$

and $\eta_t$ and $\eta_b$ are corrections for the well-known skin-effect in the two layers. Using one interpretation of the skin-effect phenomenon, these corrections are given by:

$$\eta_t = \frac{k_t(1 + 2e^{-k_t}\sin k_t - e^{-2k_t})}{2(1 - 2e^{-k_t}\cos k_t + e^{-2k_t})} \quad (9)$$

and $$\eta_b = \frac{k_b(1 + 2e^{-k_b}\sin k_b - e^{-2k_b})}{2(1 - 2e^{-k_b}\cos k_b + e^{-2k_b})} \quad (10)$$

where $$k_t = h_t\sqrt{\pi f \sigma_t \mu_o} \quad (11)$$

$$k_b = h_b\sqrt{\pi f \sigma_b \mu_o} \quad (12)$$

and $\mu_o$ is the permeability of free space.

These formulae are approximations derived from physical arguments and are based on the known behaviour of conductor loss. In particular the overall behaviour of the model converges to that of the standard FASTERIX "high-frequency model" at high frequency, and the impedances of individual nets converge to constant real values at low frequency.

In the interests of increased legibility, these equations (6), (7), (9) and (10) are reproduced on a large scale in the drawings as FIG. 15.

Figure 7:
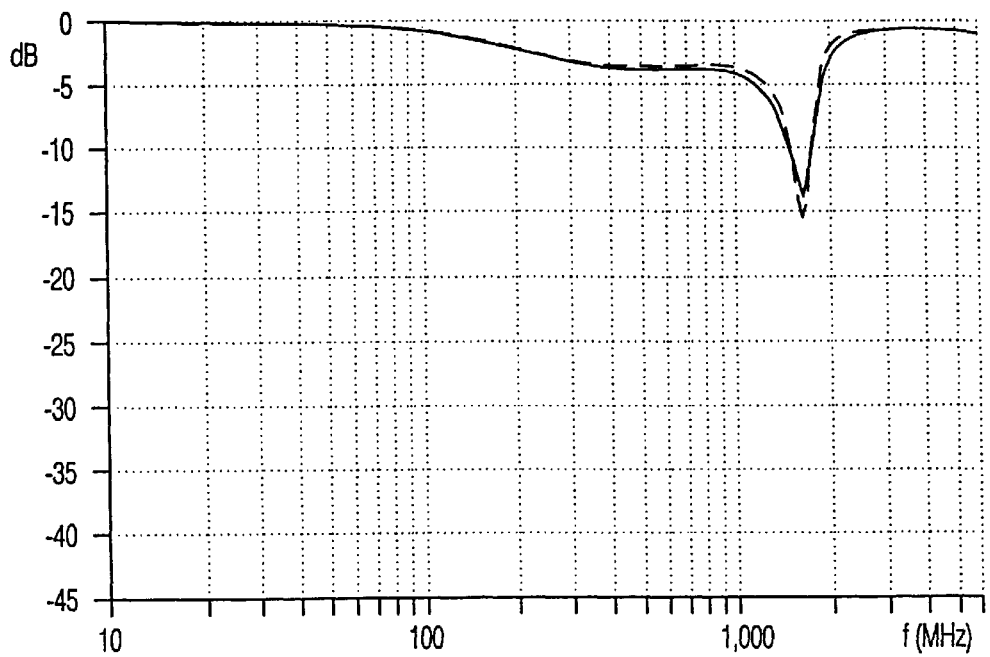
FIG. 7 is a graph of the magnitude of scattering parameter $S_{11}$ (continuous curve) as measured compared with the simulation result using the present invention (broken curve)
Figure 8:
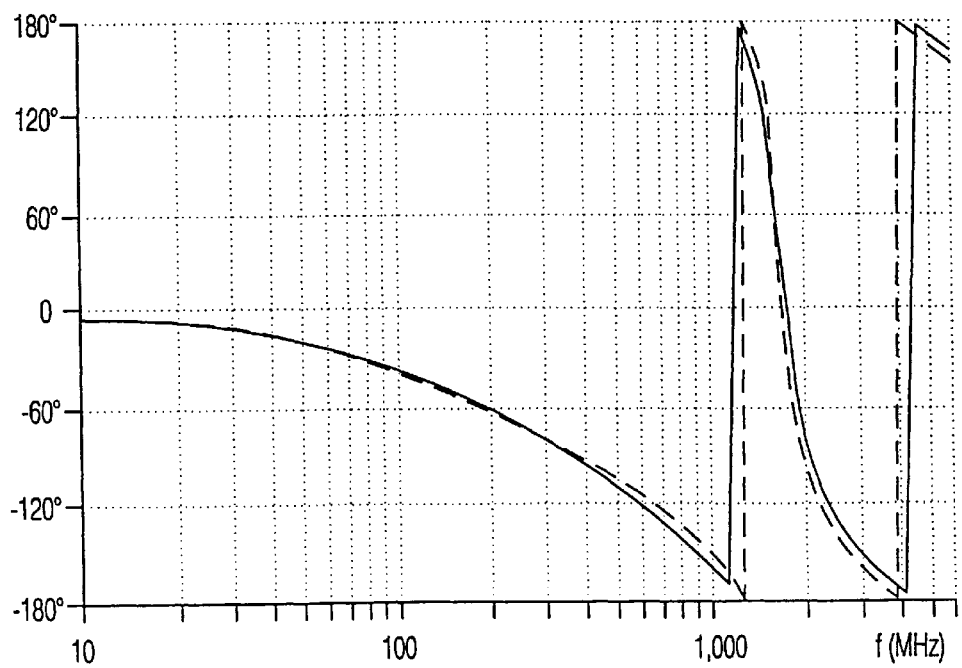
FIG. 8 is a graph of the phase of the measured $S_{11}$ (continuous curve) as compared with the simulation using the invention (broken curve)
Figure 9:
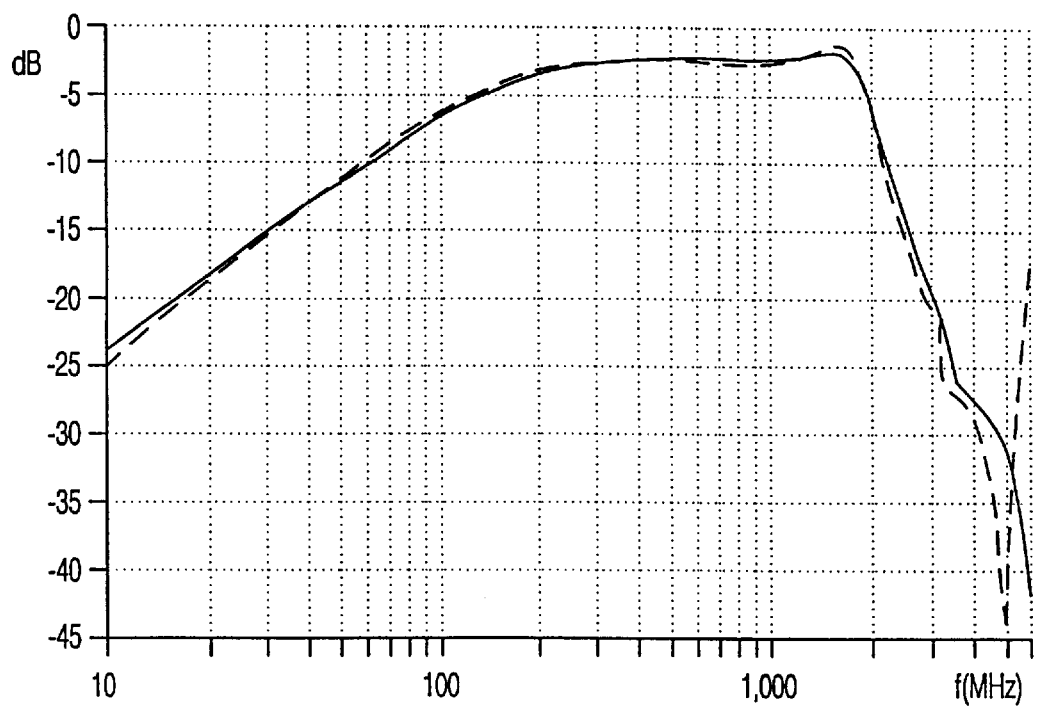
FIG. 9 is a graph of the magnitude of the measured $S_{21}$ (continuous curve) as compared with the simulation using the invention (broken curve)
Figure 10:
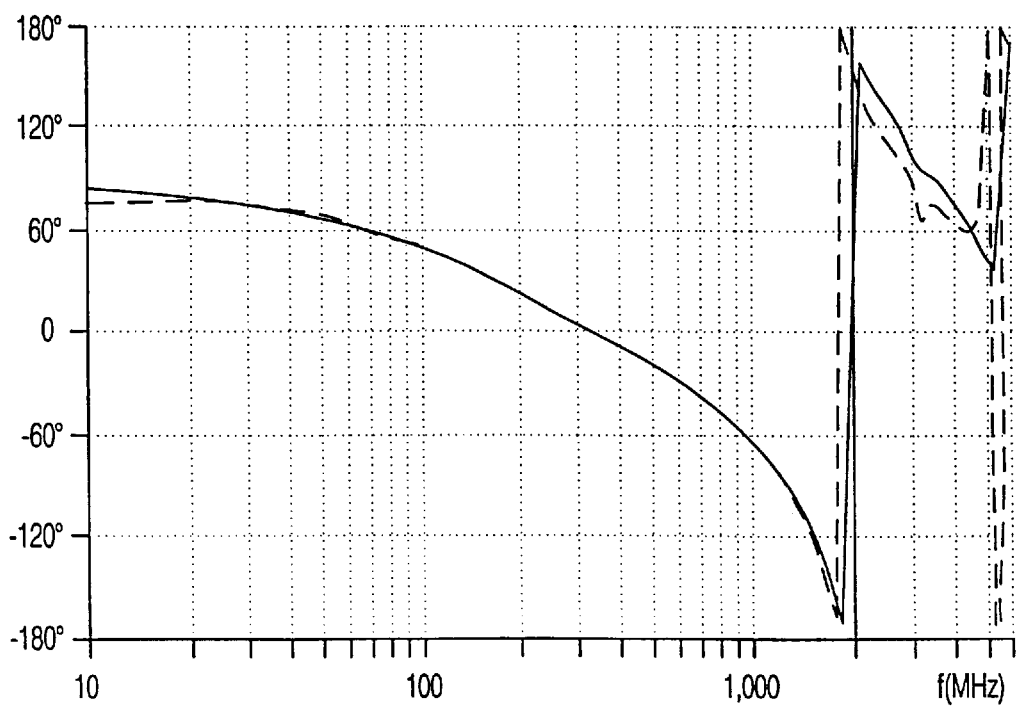
FIG. 10 is a graph of the phase of the measured $S_{21}$ (continuous curve) as compared with the simulation using the invention (broken curve)
Figure 11:
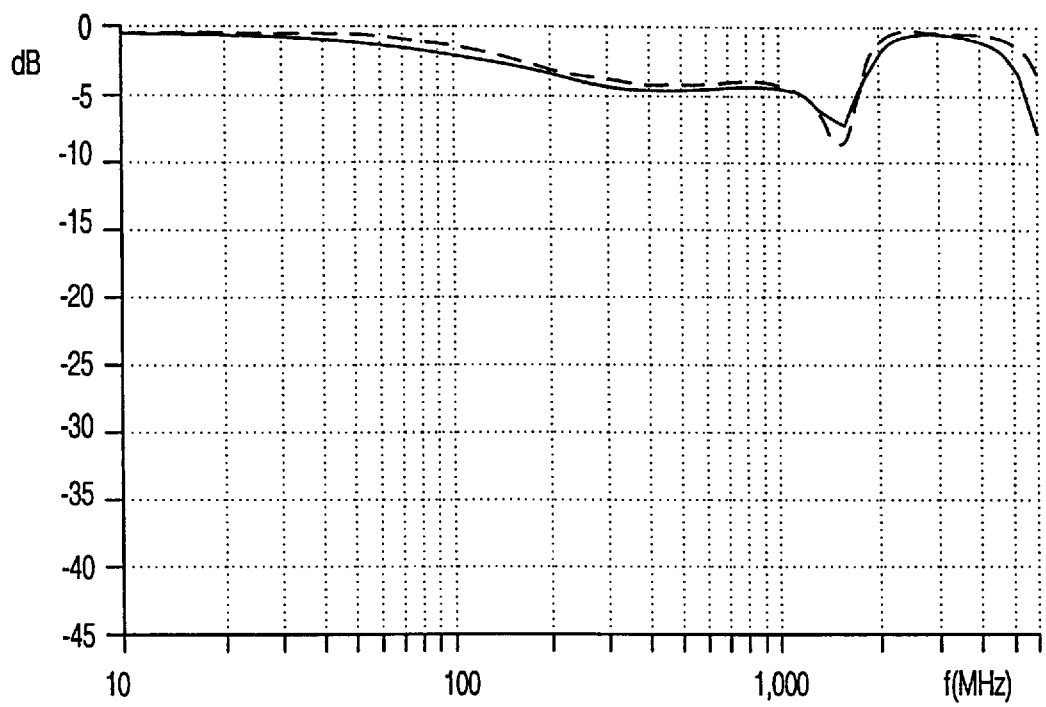
FIG. 11 is a graph of the magnitude of the measured $S_{22}$ (continuous curve) as compared with the simulation using the invention (broken curve)
Figure 12:
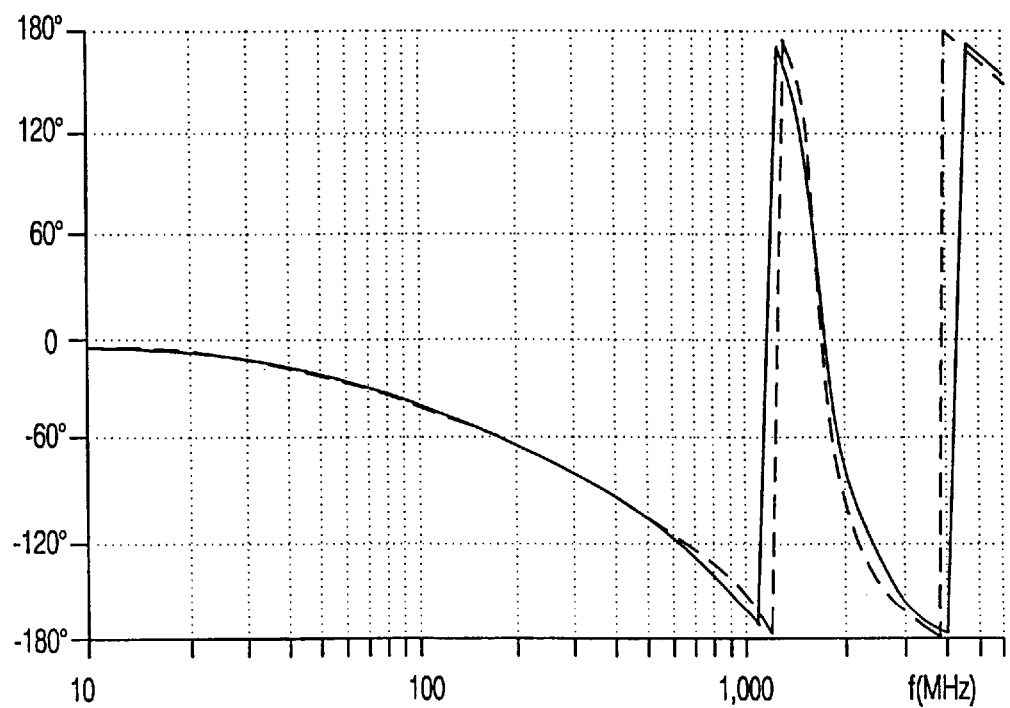
FIG. 12 is a graph of the phase of the measured $S_{22}$ (continuous curve) as compared with the simulation using the invention (broken curve)

Evaluation of the accuracy of the simulation:

FIGS. 7 to 12 relate to the FIGS. 1 and 2 example of an inter-stage matching circuit for a power amplifier and show (as a broken curve) the values of the standard scattering parameters $S_{11}$, $S_{21}$, $S_{22}$ as predicted by use of this model in accordance with the invention. FIGS. 7 and 8 are for the input reflection coefficient $S_{11}$ at the input port between $in_t$ and $gnd_t$. FIGS. 11 and 12 are for the output reflection coefficient $S_{22}$ at the output port between $out_t$ and $gnd_t$. FIGS. 9 and 10 are for the forward transmission coefficient $S_{21}$ between the input and output ports. FIGS. 7, 9 and 11 show how these parameters $S_{11}$ and $S_{21}$ and $S_{22}$ in dB vary with frequency f in MHz, whereas FIGS. 8, 10 and 12 show how the phase of these parameters $S_{11}$ and $S_{21}$ and $S_{22}$ in degrees varies with frequency f in MHz. The simulated values of $S_{11}$, $S_{21}$, $S_{22}$ were compared directly with RF probe measurements of $S_{11}$, $S_{21}$, $S_{22}$ as made on the actual IC device. The measured values are depicted in continuous curves. In both simulation and measurement, the input port was between "super-nodes" $in_t$ and $gnd_t$, the output port was between "super-nodes" $out_t$ and $gnd_t$, while "super-node" $dc_t$ was left disconnected.

The simulation required about 1 hour of computing time on a high-end computer workstation to generate the equivalent circuit model. The frequency response was then generated in about 10 seconds, when this model was run using the Philips circuit simulator PSTAR (Trade Mark). The accuracy of the simulation as shown in FIGS. 7 to 12 is remarkable. Competing CAD tools would require more than a day of computing (in some cases several days), and even then they would be unlikely to achieve such high accuracy.

A further advantage of the invention is that the effect of IC process variations can be studied interactively by simple modifications to the equivalent circuit model parameters (e.g. by changing the values of the film thicknesses or properties in the above formulas). No re-run of the computer-intensive field solver is required for such studies.

Many modifications are possible in accordance with the invention. Thus, for example, the parallel-branch model of FIG. 4 includes two parallel resistor branches $R_{hl}$ and $R_{hg}$. These two parallel resistor branches $R_{hl}$ and $R_{hg}$ may be combined into a single resistor branch. Thus, each of the sub-circuits of the equivalent circuit model used in accordance with the present invention may comprise a set of just three parallel branches of which:

a first branch includes a capacitor $C_{hc}$ which models an electric field contribution, a second branch includes an inductor $L_{hl}$ in series with a capacitor $C_{hl}$ which together model a magnetic field contribution, and a third branch includes a resistor $R_{hgl}$ which models the energy loss contribution occurring in dielectric material and conductive material 1,2 of the IC, where the resistance value of $R_{hgl}$ is given by:

$$\frac{1}{R_{hgl}} = \frac{1}{R_{hg}} + \frac{1}{R_{hl}} \quad (13)$$

From reading the present disclosure, other variations and modifications will be apparent to persons skilled in the art. Such variations and modifications may involve equivalent features and/or other features which are already known in the use of circuit simulators and in the computer-aided design and manufacture of conductor-pattern circuits and ICs, and which may be used instead of or in addition to features already described herein. Although claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The Applicants hereby give notice that new claims may be formulated to such features and/or combinations of such features during the prosecution of the present Application or of any further Application derived therefrom.

What is claimed is:

1. A simulator for simulating electromagnetic behaviour of an electrical conductor pattern, by a process which includes the steps of:

creating a geometric model of a surface of the pattern, forming a matrix representation of Maxwell's equations with values associated with electric and magnetic field couplings between locations each of which is centred on a main geometrical element, which main geometrical elements are a subset of geometrical elements in the geometric model, and correlating values of matrix coefficients of the equations with coefficients of an admittance matrix representative of an equivalent circuit model for the pattern in terms of sub-circuits which are interconnected with each other via main nodes having a one-to-one correspondence with the main geometrical elements, characterised in that the pattern forms part of an integrated circuit of thin-film passive circuit components, and in that each of the sub-circuits of the equivalent circuit model for the integrated circuit comprises a set of parallel branches of which:

a first branch includes a capacitor which models an electric field contribution, a second branch includes an inductor in series with a capacitor which together model a magnetic field contribution, and at least one further branch includes at least one resistor modelling a contribution to energy loss of the electric and magnetic fields, the energy loss occurring in dielectric material and conductive material of the integrated circuit.

2. A simulator as claimed in claim 1, further characterised in that the at least one further branch comprises a third branch and a fourth branch, the third branch includes a resistor which models that part of the energy loss which occurs in the dielectric material, and the fourth branch includes a resistor which models that part of the energy loss contribution which occurs in the conductive material.

3. A simulator as claimed in claim 1, further characterised in that the integrated circuit comprises a thin-film resistor having a resistive layer between two spaced connections of the conductor pattern, and in that the simulation is first carried out by treating the two spaced connections as corresponding directly to two main nodes and without the resistive layer being included.

4. A simulator as claimed in claim 1, further characterised in that the integrated circuit comprises a thin-film capacitor having a dielectric film between overlapping areas of a lower conductor pattern and an upper conductor pattern, and in that the simulation is carried out with two of the main nodes corresponding to locations close to the centre of these overlapping areas and with the capacitor in the first branch of the sub-circuit which connects these two main nodes having a value $C_{hc}$ given by:

$$C_{hc} = \frac{\epsilon A}{h}$$

where A is the area of overlap, and where h and $\epsilon$ are respectively the thickness of the dielectric film between the overlapping areas and its dielectric constant.

5. A simulator as claimed in claim 1, further characterised in that the integrated circuit comprises a semiconductive substrate carrying a thin-film circuit including the conductor pattern on a dielectric film on a major surface of the substrate, in that the semiconductive material of the substrate is treated as a lossy dielectric for the equivalent circuit model, and in that the value $R_{hg}$ of the resistor in the further branch which models that part of the energy loss contribution in this lossy dielectric is given by:

$$R_{hg} = \frac{\epsilon_{Si}}{\sigma_{Si} C_{hc}}$$

where the semiconductive material has a permittivity $\epsilon_{Si}$ and conductivity $\sigma_{Si}$, and where $C_{hc}$ is the value of the capacitor in the first branch which models the electric field contribution.

6. A simulator as claimed in claim 1, further characterised in that the integrated circuit comprises a thin-film inductor comprising connected areas of both a lower conductor pattern and a more conductive upper conductor pattern with a dielectric film therebetween, and in that computation of the equivalent circuit model is first carried out with values of thickness and conductivity for the lower conductor pattern equal to those for the more conductive upper conductor pattern.

7. A simulator as claimed in claim 1, further characterised in that the integrated circuit comprises a thin-film inductor in the form of at least one conductive strip portion of the conductor pattern, and in that the value Chi of the series capacitor in the second branch is given by:

$$C_{hl} = \frac{-1}{L_{hl}(2\pi f_c)^2}$$

where $L_{hl}$ is the value of the model inductor in the second branch, and $f_c$ is a cut-off frequency for all the sub-circuits.

8. A simulator as claimed in claim 1, further characterised in that the value of the resistor in the at least one further branch which models the energy loss in the conductive material includes a factor correcting for the skin effect.

9. A method of operating a simulator for simulating electromagnetic behaviour of an electrical conductor pattern, by a process which includes the steps of:

creating a geometric model of a surface of the pattern, forming a matrix representation of Maxwell's equations with values associated with electric and magnetic field couplings between locations each of which is centred on a main geometrical element, which main geometrical elements are a subset of geometrical elements in the geometric model, correlating values of matrix coefficients of the equations with coefficients of an admittance matrix representative of an equivalent circuit model for the conductor pattern in terms of sub-circuits which are interconnected with each other via main nodes having a one-to-one correspondence with the main geometrical elements, and operating on the equivalent circuit model to simulate the electromagnetic behaviour, characterised in that the simulation is carried out for an integrated circuit of thin-film passive circuit components, the pattern forming part of the integrated circuit, and in that each of the sub-circuits of the equivalent circuit model for the integrated circuit comprises a set of parallel branches of which:

a first branch includes a capacitor which models an electric field contribution, a second branch includes an inductor in series with a capacitor which together model a magnetic field contribution, and at least one further branch includes at least one resistor modelling a contribution to energy loss of the electric and magnetic fields, the energy loss occurring in dielectric material and conductive material of the integrated circuit.

10. An integrated circuit of thin-film passive circuit components designed using by a method as claimed in claim 9.

11. An integrated circuit of thin-film passive circuit components designed using a simulator as claimed in claim 1.

* * * * *